United States Patent [19]

Moore et al.

[11] Patent Number: 4,822,089

[45] Date of Patent: Apr. 18, 1989

[54] TRUCK AXLE GRASPING ATTACHMENT FOR TOWING VEHICLES

[75] Inventors: Vernon S. Moore, Ringgold, Ga.; Reed K. Hamman, Newbern, Tenn.

[73] Assignee: Holmes International Inc., Chattanooga, Tenn.

[21] Appl. No.: 159,784

[22] Filed: Feb. 23, 1988

[51] Int. Cl.⁴ .............................................. B66C 1/28
[52] U.S. Cl. .................... 294/82.34; 294/904; 414/563
[58] Field of Search ............. 280/292, 47.15, 503, 280/508; 414/563; 294/82.27, 82.34, 904

[56] References Cited

U.S. PATENT DOCUMENTS

| | | | |
|---|---|---|---|
| 1,446,488 | 2/1923 | Vatter | 280/47.15 |
| 1,447,758 | 3/1923 | Chagnon | 280/47.15 |
| 1,488,744 | 4/1924 | Ekberg | 294/904 X |
| 1,783,189 | 12/1930 | Green | 414/563 X |
| 4,061,103 | 12/1977 | Mampaey | 294/82.27 X |

*Primary Examiner*—Johnny D. Cherry
*Assistant Examiner*—Gary C. Hoge
*Attorney, Agent, or Firm*—Alan Ruderman

[57] ABSTRACT

A truck axle grasping attachment for use with towing vehicles for lifting a truck by its front axle. The attachment is in the form of a cradle having a pair of spaced apart upstanding tangs, one of the tangs, that being the front tang, being fixed, and the other of the tangs, that being the rear tang, being mounted for movement so that the attachment may be slidably positioned for receipt of the truck axle within the cradle without interference of the axle by the rear tang. In one embodiment the rear tang is pivotably mounted on the base of the cradle and has an integral arm adapted to be contacted by the axle as the attachment moves into axle capturing relationship, and when so doing moves the rear tang into operative position. In other embodiments the rear tang is removably carried by the base of the cradle.

15 Claims, 2 Drawing Sheets

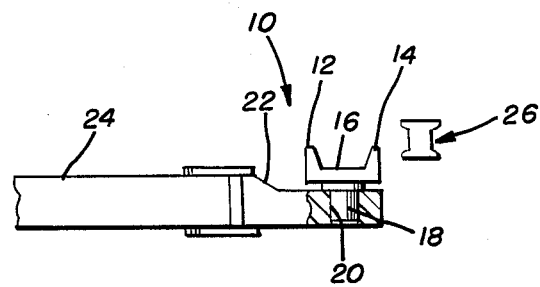
FIG. 1
PRIOR ART
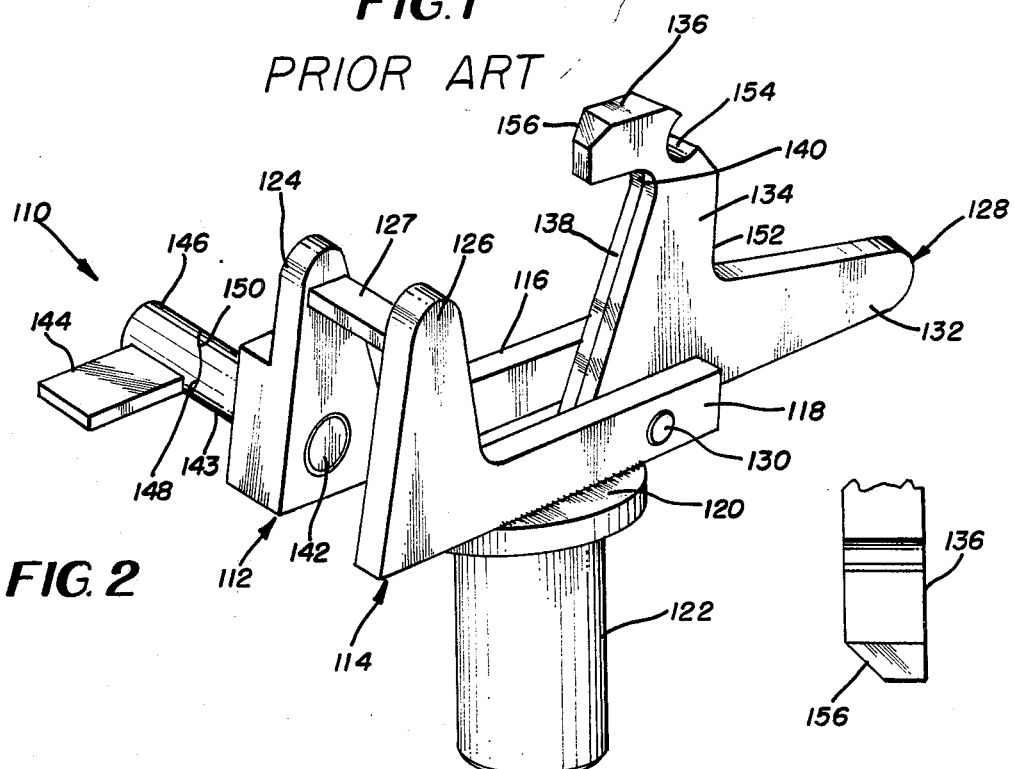
FIG. 2
FIG. 3
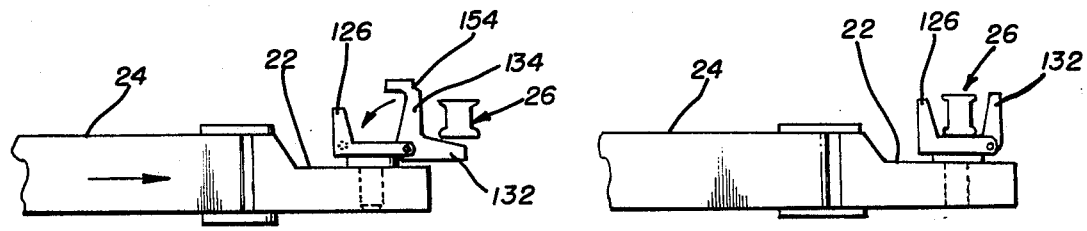
FIG. 4A
FIG. 4B

TRUCK AXLE GRASPING ATTACHMENT FOR TOWING VEHICLES

BACKGROUND OF THE INVENTION

This invention relates to an attachment for grasping the axle of trucks for loading the truck for towing and the like, and more particularly to an attachment which has spaced tangs for cradling the axle therebetween, one of the tangs being fixed and the other tang being mounted for movement relatively to the fixed tang for permitting rapid and safe capture of low lying axles.

When loading a truck for lifting and towing, the front axle of the truck is supported on a pair of spaced apart troughs or U-shaped cradles between the leading and trailing upstanding walls thereof. These axle engaging cradles are removably carried by a cross-bar which is pivotably connected about a vertical axis to the lifting and towing boom of the towing vehicle, and thus the cradles are known in the art as truck axle attachments.

The known truck axle attachments have the upstanding walls and the base therebetween constructed as a unitary member. The walls, must for safety purposes, be relatively high so that the axle can be supported on the base therebetween without slipping off when being towed. However, a problem is presented for trucks having front axles lying low to the ground since there is no clearance for the rear wall of the cradle to slip under the axle. In these instances the tow truck operator must remove the attachments from the cross-bar, slide the cross-bar beneath the axle and lift the truck with the cross-bar. After the truck has been lifted sufficiently, blocks are placed under the front tires and the truck is set back down with the tires supported on the blocks. With the axle thus raised, the rear wall of the attachment will slide under the axle. The attachments are then reinserted into the cross-bar and the cross-bar is then raised to cradle the axle in the attachment and the blocks are then removed.

The difficulties presented by the prior art truck axle attachments thus include the inconvenience of requiring the additional steps involved in raising the truck to block up the tires, reinserting the attachments to engage the axle and then removing the blocks. Additionally, and of even greater importance, is the hazard involved in lifting the truck on the cross-bar without the attachments, since there is then no means presented for preventing the truck from moving and falling off the cross-bar.

SUMMARY OF THE INVENTION

Consequently, it is a primary object of the present invention to provide a truck axle grasping attachment which permits the cross-bar of a towing vehicle to freely slide beneath the axle of a vehicle to be towed, the attachment having a movable tang for permitting rapid and safe capture of the rear portion of the axle.

It is another object of the present invention to provide a truck axle grasping attachment for use with towing vehicles for lifting a truck by its front axle, the attachment comprising a cradle having a pair of spaced apart upstanding tangs, one of the tangs being fixed and the other tang being movable relative to the fixed tang to permit the axle to enter the cradle between the tangs.

It is a further object of the present invention to provide a truck axle grasping attachment for use with towing vehicles for lifting a truck by its front axle, the attachment comprising a cradle having a pair of spaced apart upstanding tangs, one of the tangs being fixed and another of the tangs being pivotably mounted, the pivotably mounted tang being pivotable from a first position permitting the axle to be received in the cradle between the tangs and thereafter to pivot to a second position closed about the axle.

It is a yet further object of the present invention to provide a truck axle grasping attachment for use with towing vehicles for lifting a truck by its front axle, the attachment comprising a cradle having a pair of spaced apart upstanding tangs, one of the tangs being fixed and the other of the tangs being removably positioned within a seat, the removable tang being disposed in the seat after the axle is positioned in the cradle.

It is a yet still further object of the present invention to provide a truck axle grasping attachment for use with towing vehicles for lifting a truck by its front axle, the attachment comprising a cradle having a pair of spaced apart upstanding tangs, one of the tangs being fixed and the other of the tangs being pivotably mounted, the pivotably mounted tang being moved from a first position to a second position by engagement thereof with the axle, the first position permitting the axle to enter the cradle and the second position locking the axle in the cradle between the tangs.

Accordingly, the present invention provides a truck axle grasping attachment for use with towing vehicles for lifting a truck by its front axle, the attachment comprising a cradle having a pair of spaced apart upstanding tangs, one of the tangs being fixed and the other of the tangs being mounted for movement relatively to the fixed tang. In one embodiment the movable tang is pivotably mounted relatively to the fixed tang for movement from a first substantially horizontal open position to a second substantially upstanding closed position. The movable tang preferably has means including an abutment surface for engagement with the axle of the truck as the attachment is moved under the axle, and the axle pivotably rotates the tang by engagement with the abutment surface to the upstanding closed position. Additionally, the abutment surface further includes means engagable with a locking member when in the upstanding closed position to lock the tang in the closed position. In another embodiment of the invention the movable tang is removably disposed in a seat spaced from the fixed tang and is removed from the seat to permit the attachment to slip under the axle, whereupon the removable tang may be inserted into the seat behind the axle with the axle disposed between the tangs.

In each embodiment of the invention the cross-bar carrying the attachments may be slipped under the axle of the truck being lifted without the need for first lifting the truck and blocking the tires as in the prior art. The cross-bar may merely be lowered to a position equivalent to that of the base of the cradle and thereafter extended rearwardly from the towing vehicle to under the truck axle. In the first embodiment the movable tang is closed about the axle without the aid of the operator. The operator may act to engage a locking device after the tang has been moved to the closed position by engagement with the axle itself, but in the preferred embodiment the locking device is actuated before the tang is closed and the tang is then self-locking. In the other embodiments the operator need only drop the movable tang into the seat after the cross bar has been positioned with the axle disposed between the first tang and the seat.

BRIEF DESCRIPTION OF THE DRAWINGS

The particular features and advantages of the invention as well as other objects will become apparent from the following description taken in connection with the accompanying drawings, in which:

FIG. 1 is a fragmentary elevational view partly in section of a prior art attachment illustrating a truck axle diagrammatically;

FIG. 2 is a perspective view of a first embodiment of an attachment constructed in accordance with the principles of the present invention;

FIG. 3 is a fragmentary top plan view of a portion of the pivotably movable tang;

FIG. 4A is a diagrammatic elevational view illustrating the principle of operation of the attachment of FIG. 2;

FIG. 4B is a view similar to FIG. 3A but illustrating the attachment securely positioned about the truck axle;

DESCRIPTION OF THE PREFERRED EMBODIMENTS

Figure 5:
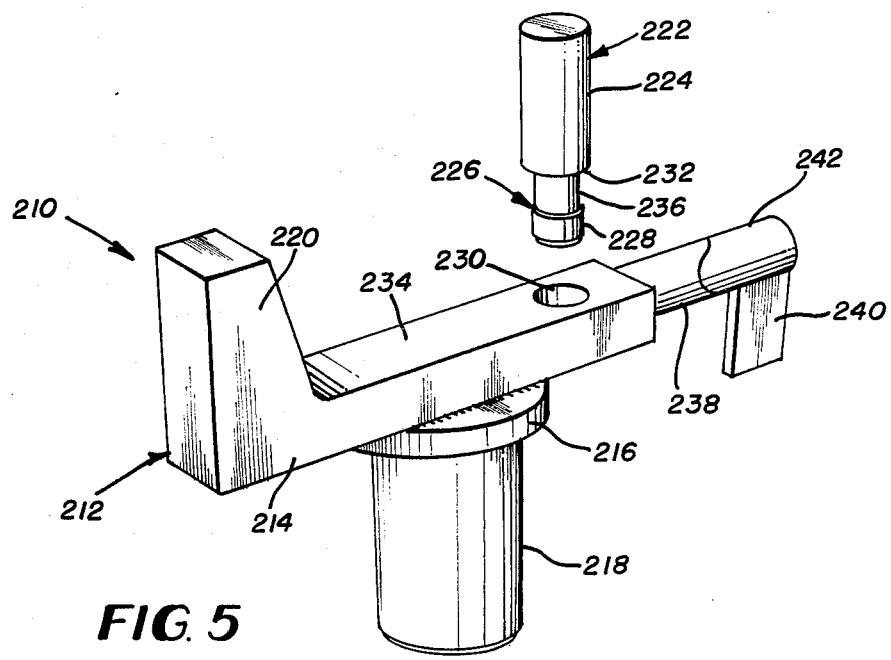
FIG. 5 is a perspective view of a second embodiment of an attachment constructed in accordance with the principles of the present invention.

Referring to the drawings, FIG. 1 illustrates a prior art truck axle attachment 10, which is in the form of a cradle or trough having a pair of spaced walls 12, 14 formed integral with a base 16, the base 16 having a mounting stem 18 extending from the lower exterior surface thereof. The attachment 10 is removably positioned within a bore 20 formed in a laterally extending cross-bar 22 which may be pivotably connected about a vertical axis to a longitudinally extendible lifting boom 24 carried by a towing vehicle (not illustrated). When lifting a truck or the like by its front axle, illustrated generally at 26, the lifting boom 24 is lowered and extended to beneath the axle 26 for receipt thereof on the base 16 between the walls 12, 14. However, many trucks have the front axle disposed closely to the ground and even when the boom 24 with the cross-bar is lowered to the lowermost position, the walls 12, 14 extend vertically to a level such that the rearmost wall 14 cannot slip beneath the axle. In these instances, as aforesaid, the operator must remove the attachments from the opposite ends of the cross-bar, slide the cross-bar beneath the axle and lift the truck with the cross-bar. Blocks are then placed under the tires and the truck is set back down with the tires supported on the blocks. Thereafter the attachments are reinserted into the cross-bar and moved so that the walls 12 and 14 are at opposite sides of the axle, and the cross-bar is then lifted by means of the boom.

In order to overcome these difficulties of the prior art attachments, the present invention provides a truck axle attachment which may be slipped beneath the truck axle 26 without first lifting the truck and blocking up the tires. To this end the invention forms the rearmost wall of the cradle as a movable member, it being in one form of the invention a pivotable member, and in other forms of the invention a removable member.

Referring to FIG. 2, in the first embodiment of the invention, the attachment 110 comprises a yoke member bifurcated to form of a pair of substantially L-shaped brackets 112, 114 spaced apart laterally one from the other. Each of the brackets 112, 114 includes a respective base portion 116, 118 secured as by welding to a disk-like member 120 secured to or integral with a mounting stem 122 adapted for receipt within the bore 20 of the cross-bar 22, and a respective upstanding tang portion 124, 126. A bridge member 127 may be fastened to an upper part of the tang portions for added structural strength. The tang portions 124, 126 effectively form one wall of the cradle within which the truck axle is supported. The other wall means of the cradle, i.e., the rear wall is formed by a pivotably mounted member 128 journalled on a pin 130 intermediate the base portions 116, 118 of the brackets 112, 114. The member 128 is in the form of a bell-crank lever having one arm in the form of a tang 132 extending angularly from a second arm 134 such that the tang 132 may rotatably pivot from a substantially horizontal disposition to a substantially vertical disposition while the arm 134 rotatably pivots from a substantially vertical disposition to a substantially horizontal disposition 180° from the horizontal position in which the tang 132 may be disposed.

Extending from the free end of the arm 134, i.e., the end remote from the tang 132, is a finger 136, the finger 136 extending in the opposite direction to that of the tang 132. The intersection of the finger 136 and the adjacent edge 138 of the arm 134 includes an arcuate crotch 140 which, when the tang 132 is disposed in the vertical position, grips the periphery of the disk-like member 120 while the edge 138 is disposed on the top surface of the disk-like member 120. Journalled for linear sliding movement in one of the fixed tangs, such as tang 124, is a bolt or plunger 142 which is movable within a housing 143 toward and away from the tang 126 by means of an operator engagable handle 144 attached adjacent to the end of a rotatable bolt 146 connected to the end of the bolt 142 remote from the tang. The bolt housing 143 and the rotatable bolt 146 have respective angular cam surfaces 148, 150 such that rotation of the bolt 146 effects a camming action to move the bolt 142 against the action of a spring (not illustrated) internal of the bolt housing 143.

At the intersection between the finger 136 and the edge 152 of the arm 134 remote from the edge 138 is an arcuate indentation or recess 154 adapted to receive a peripheral portion of the bolt 142 when the tang 132 is disposed vertically and the edge 138 is disposed on the top of the disk-like member. When the tang 132 is in this position the bolt 146 may be rotated by means of the handle 144 to force the bolt 142 in toward the tang 126 and engage the recess 154 to prevent the tang 132 from pivoting toward the horizontal position However, it is preferred that the bolt 142 be in the locking position before the tang 132 has been rotated to the vertical position. To this end, the finger 136 includes a cam surface 156 on one side thereof, i.e., the side facing the bracket 112. Additionally, the bolt 142 when extended between the brackets 112, 114 in the locking position does not extend fully to the bracket 114. Thus, when the member 128 is forcibly rotated from the open position illustrated in FIG. 4A to the closed position illustrated in FIG. 4B, the cam surface 56 slides along the extended end of the bolt 142 until the bolt 142 is received within the recess 154 and the member 128 is locked.

In operation, the movable tang 132 is initially positioned in the horizontal position as illustrated in FIG. 4A and the boom 24 is lowered and extended rearwardly until it has been positioned such that the tang 132 is below the axle 26 and with the edge 152 of the arm 134 disposed for abutting the forward edge of the axle. Further extension of the boom 24 effects engagement of the axle with the edge 152 of the arm 134 to rotate the entire member 128 about the pivot pin 130 until the edge 138 of the arm 134 rests on the disk-like member 120. When this occurs the axle 26 is disposed between the forward tangs 124, 126 and the now vertically disposed movable tang 132 as illustrated in FIG. 4B. The operator may then rotate the handle 144 to insert the bolt 142 through the tang 124 so that it may engage the recess 154 to lock and thereby prevent pivotable rotation of the tang 132 to the open or horizontal position when the tang 132 is engaged by the axle during towing. However, as aforesaid, the locking action may occur automatically by having the bolts 142 inserted prior to engaging the truck axle by the edge 152 of the arm 134. When both sides of the axle are so received within a respective attachment, the boom 24 may be retracted to a desirable position and the boom and cross-bar lifted for towing the truck. Accordingly, the axle 26 is quickly received within the cradle formed by the forward tangs 124, 126 and the rear tang 132 without any need for the operator to first lift the truck with the cross-bar or to block-up the wheels to slip the rear tang of the attachment behind the axle. All that the operator needs to do, aside from conventionally extending, retracting, raising and lowering the boom and the cross-bar, is to rotate the handle 144 to insert the bolt 142 before or after the axle is within the cradle of each attachment. If done before, the locking action occurs automatically as the axle rotates the member 128.

A second embodiment of the invention is illustrated in FIG. 5. Here the attachment 210 comprises a substantially L-shaped member 212 having a base 214 secured, as by welding, to a disk-like member 216 secured to or formed integral with the mounting stem 218 and an upstanding tang 220 forming one wall of the axle support cradle. The other wall of the cradle is formed by a removable tang 222 in the form of a cylindrical peg having an upper portion 224 of first diameter and a lower portion 226 of reduced diameter. The bottom-most portion 228 of the lower portion 226 has a diameter substantially the same as and adapted to be received within a bore 230 formed in the base 214 spaced from the fixed tang 220, while the upper tang 224 has a diameter larger than that of the bore 230 so as to form a ledge 232 defining an abutment seat with the upper surface 234 of the base 214 when the lower portion is disposed within the bore 230. Intermediate the upper portion 224 and the bottom-most portion 228 the peg may be indented to a reduced diameter at 236 relative to that of the portion 228 and a bolt (not illustrated) may be disposed in a bolt housing 238 so as to be slidably disposed in a bore in the end of the member 212 remote from the fixed tang 220, the latter bore opening into the bore 230. The bolt may preferably have an arcuate end adapted to engage the surface 236 when the tang 222 is inserted in the bore 230 and the bolt is pushed into the end of the member 212 by means of a handle 240 fastened to a bolt 242 thereby to preclude the tang 222 from movement upwardly. The bolt housing 238 and the bolt 242 have angular cam surfaces similar to that disclosed in reference to the first embodiment.

In the operation of this embodiment, the operator merely removes the tang 222 from each attachment, slides the cross-bar with the attachment thereon under the axle such that the axle is disposed just above the surface 234 of the base 214, and thereafter reinserts the movable tang 222 in the bore 230. The tang 222 may thereafter locked in the bore by means of the bolt acting within the bolt housing 238, and the truck may then be lifted and towed in conventional manner.

Figure 6:
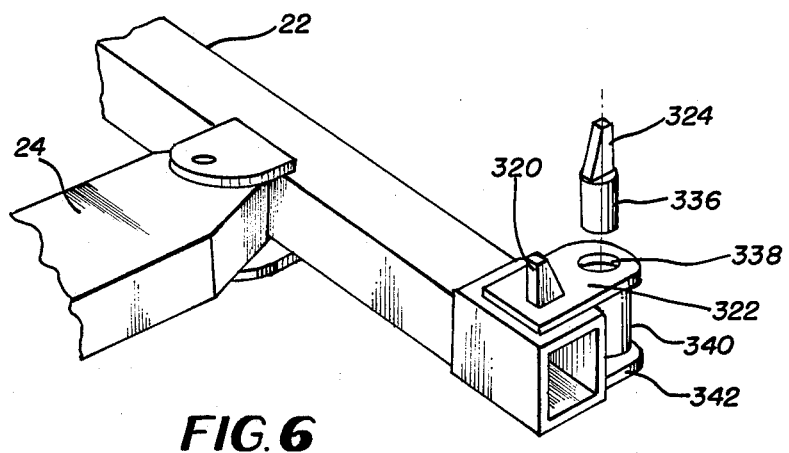
FIG. 6 is a perspective view of a modification of the second embodiment.

A modification of the second embodiment is illustrated in FIG. 6 wherein rather than a separate attachment mounted within the bore in the cross-bar by a mounting stem, a fixed tang 320 is fastened to a base plate 322 at each end of the cross-bar (only one of which is illustrated) and a removable tang 324 is integrally formed with a small mounting stem 336 at the bottom thereof, the mounting stem 336 together with the tang 324 being removably received within a bore 338 in the plate 322. The bore 338 may open into a downwardly depending guide 340 secured to the bottom of the plate 322 and supported on another plate 342 secured to the cross-bar below the plate 322 so that the bottom of the stem 338 may rest on the plate 342 or on another plate disposed within the guide 340. In all other respects, and in its operation, this device functions in the same manner as that illustrated in FIG. 5.

Numerous alterations of the structure herein disclosed will suggest themselves to those skilled in the art. However, it is to be understood that the present disclosure relates to the preferred embodiments of the invention which is for purposes of illustration only and not to be construed as a limitation of the invention. All such modifications which do not depart from the spirit of the invention are intended to be included within the scope of the appended claims.

What is claimed is:

1. An axle grasping attachment for use in conjunction with a cross-bar of a towing vehicle so that a low lying front axle of a disabled truck or the like may be supported on a pair of attachments at respective sides of the truck for lifting and towing the truck, said attachment comprising a cradle having a base upon which said axle may be supported and a pair of tangs upstanding from the base at least when said axle is supported on the base and spaced apart transversely to the axle to define a front tang and a rear tang relative to said truck, said front tank being secured to said base, and means for movably mounting said rear tang relative to said base and said front tang for movement from said upstanding relationship to open the cradle for permitting said base to be disposed readily beneath the axle with the front tang juxtaposed adjacent the front of the axle without interference by the rear tang with the axle, said means for movably mounting said rear tang further permitting said rear tang to be moved into upstanding relationship with the base to close the cradle so that the front and rear tangs may straddle said axle, and a support member fixed to and depending downwardly from said base and adopted to be carried by said cross-bar.

2. An attachment as recited in claim 1, wherein said rear tang is pivotably mounted on said base about a horizontal axis for pivoting between a position upstanding relative to the base and to a position extending rearwardly from the base.

3. An attachment as recited in claim 2, wherein said rear tang has an integral arm disposed substantially normal to said rear tang, said arm being disposed for abutment with said axle when said rear tang extends rearwardly and is disposed beneath said axle when said rear tang is upstanding, whereby upon rearward movement of said attachment relative to said axle said axle may force said arm to pivot and rotatably move said rear tang into upstanding disposition.

4. An attachment as recited in claim 3, including means for locking said arm when said tang is in said upstanding disposition.

5. An attachment as recited in claim 1, wherein said base and said front tang are bifurcated and said rear tang is pivotably mounted on a journal pin supported between spaced apart portions of said base.

6. An attachment as recited in claim 5, wherein said rear tang has an integral arm disposed substantially normal to said rear tang, said arm being disposed for abutment with said axle when said rear tang extends rearwardly and is disposed on said support member beneath said axle when said front tang is in upstanding disposition, whereby upon rearward movement of said attachment relative to said axle said axle may force said arm to pivot between spaced portions of said base and rotably move said rear tang into upstanding disposition.

7. An attachment as recited in claim 6, including means for locking said arm when said tang is in said upstanding disposition.

8. An attachment as recited in claim 7, wherein said means for locking comprises a bolt slidably journalled in one of the bifurcated front tangs for movement toward the other of the bifurcated front tangs, said bolt being disposed above said arm when said rear tang is in upstanding relationship to preclude upward movement of said arm.

9. An attachment as recited in claim 8, wherein said arm includes a finger remote from said journal pin, said finger extending oppositely to said rear tang, said finger having a cam surface for slidably camming an end of said bolt intermediate said front tangs and permitting the remainder of said finger to rotate beneath said bolt as said arm is further rotated by engagement with said axle.

10. An attachment as recited in claim 9, including a recess at the junction of said finger and said arm for receiving said bolt.

11. An attachment as recited in claim 1, wherein said base includes a recess spaced from said front tang, and said rear tang includes a mounting portion at the lower extremity thereof removably positionable in said recess.

12. An attachment as recited in claim 11, wherein said mounting portion has a reduced cross-sectional configuration relative to the remainder of said rear tang to form a ledge defining an abutment seat on said base.

13. An attachment as recited in claim 12, including means for locking said mounting portion in said recess.

14. An attachment as recited in claim 13, wherein said means for locking said mounting portion comprises a bore extending through said base and opening into said recess, a locking bolt extending through said bore, said mounting portion of said rear tang including an indented section intermediate the bottom of said mounting portion and said ledge, and said locking bolt including means for engaging said indented section to preclude upward movement of said rear tang.

15. An attachment as recited in claim 11, wherein said base includes a downwardly depending guide through which said recess extends, and a plate fastened to said guide beneath said recess for forming an abutment surface for the bottom of said mounting portion when said rear tang is positioned in said recess.

* * * * *